Figure 1:
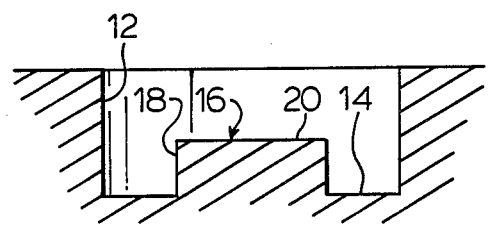
Figure 2:
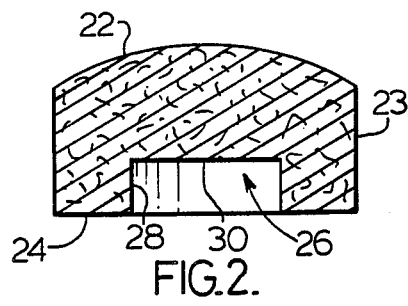

United States Patent [19]

Wilkins

[11] Patent Number: 4,725,444
[45] Date of Patent: Feb. 16, 1988

[54] METHOD OF MAKING BUNS OR LIKE PRODUCTS PRODUCED FROM DOUGH

[76] Inventor: Robert J. Wilkins, 123 Reding Road, Ancaster, Ontario L9G 1M9, Canada

[21] Appl. No.: 899,849

[22] Filed: Aug. 25, 1986

Related U.S. Application Data

[63] Continuation-in-part of Ser. No. 785,375, Oct. 8, 1985, abandoned.

[51] Int. Cl.$^4$ ................................................. A23P 1/10
[52] U.S. Cl. ..................................... 426/280; 426/138; 426/283; 426/389; 426/518
[58] Field of Search ................ D1/129, 101, 102, 105; 426/138, 512, 128, 94, 143, 275, 274, 279, 280, 282, 283, 389, 396, 518; 249/117

[56] References Cited

U.S. PATENT DOCUMENTS

| | | | |
|---|---|---|---|
| 1,476,910 | 12/1923 | Naugle | 249/DIG. 1 |
| 1,531,569 | 3/1925 | Rade | 249/DIG. 1 |
| 1,567,234 | 12/1925 | Brucker | 249/DIG. 1 |
| 1,600,191 | 9/1926 | Mandelbaum | D1/101 |
| 1,696,343 | 12/1928 | Burdick | 426/391 |
| 1,718,668 | 6/1929 | Smythe | 249/DIG. 1 |
| 1,815,527 | 8/1931 | Scruggs | 426/138 |
| 1,816,283 | 7/1931 | Holibaugh | 426/138 |
| 2,012,815 | 8/1935 | Hodges | 249/117 |
| 3,908,022 | 9/1975 | Selleck | 426/391 |
| 4,009,859 | 3/1977 | Bangert | 249/DIG. 1 |
| 4,065,581 | 12/1977 | Heiderpriem | 426/138 |

OTHER PUBLICATIONS

Family Circle Illustrated Library of Cooking, 1972 Rockville House Publishers Inc., vol. 2, p. 203 and vol. 4, pp. 391–393.

Ovenjoy Caddies Food Package, May 1978.

Primary Examiner—Raymond N. Jones
Assistant Examiner—Carolyn Paden
Attorney, Agent, or Firm—Robert F. Delbridge; Arne I. Fors

[57] ABSTRACT

A method of making a bun or like edible product produced from dough includes placing dough in a mold having an outer peripheral wall defining the outer periphery of a bun to be baked, a flat bottom wall extending inwardly from the outer peripheral wall, and an upstanding recess-forming member surrounded by the bottom wall. The recess-forming member has an inner peripheral wall extending upwardly from the bottom wall and a top extending across the top of the inner peripheral wall. The dough is baked in the mold to form a bun having a flat bottom surface with a recess, and the bun is then cut across a horizontal plane above the recess to provide an upper part and a lower part, the lower part is turned upside-down to position the recessed surface uppermost, edible filling material is placed in the recess, and the upper part is placed on the upside-down lower part to form a filled bun.

6 Claims, 11 Drawing Figures

METHOD OF MAKING BUNS OR LIKE PRODUCTS PRODUCED FROM DOUGH

This application is a continuation-in-part of U.S. application Ser. No. 785,375 filed Oct. 8, 1985 (now abandoned).

This invention related to methods of making buns or like products produced from dough, and also to buns or like products produced thereby.

Food products are often prepared by sandwiching edible material between two bun-halves, typical examples being hamburgers or hot dogs. It is a common problem that, when such products are eaten, some of the edible sandwiched material is squeezed out from the product and falls therefrom.

It is therefore an object of the invention to provide a method and resulting product which substantially overcomes this problem.

The present invention provides a method of making a bun or like edible product produced from dough, said method comprising placing dough in a mold having an outer peripheral wall defining the outer periphery of a bun to be baked, a flat bottom wall extending inwardly from the outer peripheral wall, and an upstanding recess-forming member surrounded by the bottom wall, said recess-forming member having an inner peripheral wall extending upwardly from said bottom wall, and a top extending across the top of the inner peripheral wall, baking the dough in the mold to form a bun having a flat bottom surface with a recess, cutting the bun across a horizontal plane above the recess to provide an upper part and a lower part, turning the lower part upside down to position the recessed surface uppermost, placing edible filling material in the recess, and placing the upper part on the upsidedown lower part to form a filled bun.

Advantageously, the top wall of the mold is curved in a downwardly bowed manner, it having been found that this feature assists in centering the dough when it is dropped into the mold.

The inner peripheral wall of the recess-forming member is preferably upwardly and inwardly inclined, it having been found that this feature facilitates extraction of the bun from the mold after baking. Preferably, the inner peripheral wall is outwardly bowed as well as being upwardly and inwardly inclined.

Also, the height of the recess-forming member is preferably about half the height of the outer peripheral wall of the mold.

The invention thus also provides a bun or like edible product, prepared by baking dough, said bun having an upper part and a lower part, said upper part having a flat lower surface, and said lower part having a peripherally continuous flat upper surface surrounding a recess and having a flat lower surface, said upper part being positioned on top of the lower part with the flat lower surface of the upper part engaging the peripherally continuous flat upper surface of the lower part to close the recess.

The present invention has various advantages over the prior art. The surface of the recess has a crust, since it was an external surface during baking, with the result that edible filling material in the recess is less likely to soak into the lower part. Condiments may be placed in the recess, and meat or other substantial filling placed on top. A hamburger or meat patty and/or lettuce may extend to or beyond the edges of the upper and lower parts, with the result that the product retains a conventional appearance. However, since the condiments are below the meat, instead of above as is usual in the prior art, a consumer will experience maximum flavor of the condiments since taste buds are only located on the tongue and not elsewhere in the mouth.

Figure 9:
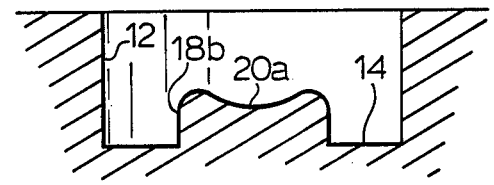
Figure 10:
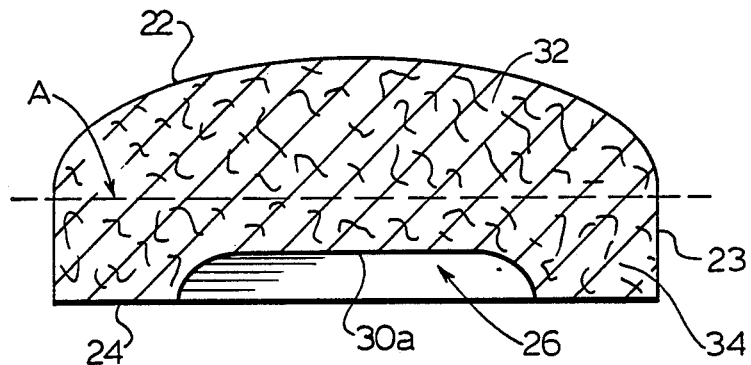
Figure 11:
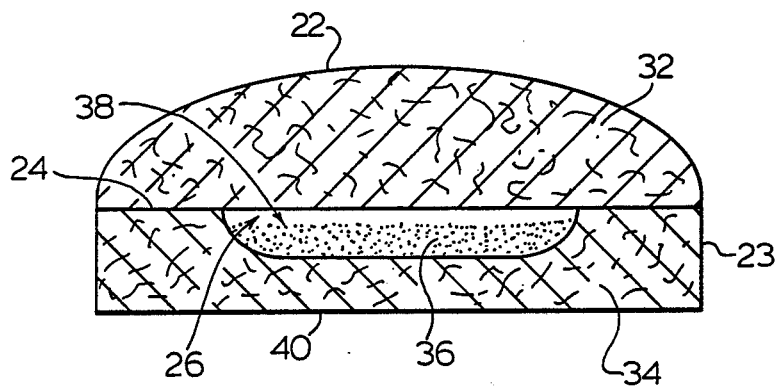

Embodiments of the invention will now be described, by way of example, with reference to the accompanying drawings, of which:

FIGS. 1, 3, 5, 7 and 9 are diagrammatic sectional view of molds in accordance with various embodiments of the invention, FIGS. 2, 4, 6, 8 and 10 are diagrammatic sectional views of buns produced from the respective molds, and FIG. 11 is a diagrammatic sectional view of a filled bun produced from the bun of FIG. 1 10.

With reference to the accompanying drawings, FIG. 1 shows a mold with an outer peripheral wall 12, a bottom wall 14 and a recess-forming member 16, the recess-forming member 16 having an inner peripheral wall 18 and a top wall 20. The resulting bun shown in FIG. 2 has a curbed upper surface 22, a vertical side wall 23, and a bottom surface 24 with a recess 26, the recess 26 having a peripheral side wall 28 and a bottom wall 30.

Figure 3:
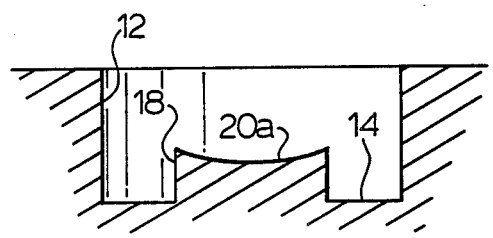
Figure 4:
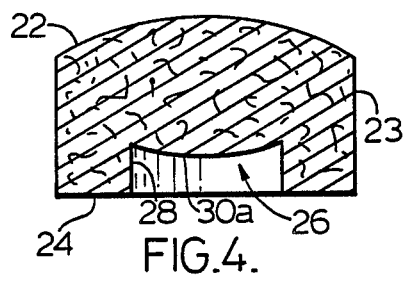

In FIG. 3, the top wall 20a is curved in a downwardly bowed manner to facilitate centering of the dough when it is dropped into the mold. The resultant bun shown in FIG. 4 thus has a recess 26 with a bottom wall 30a which is bowed towards the bottom surface 24.

Figure 5:
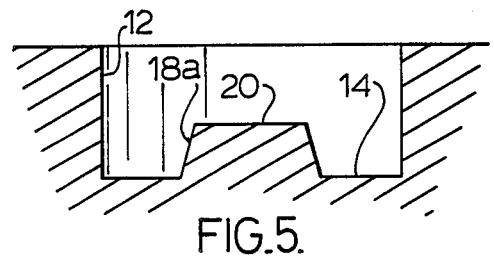
Figure 6:
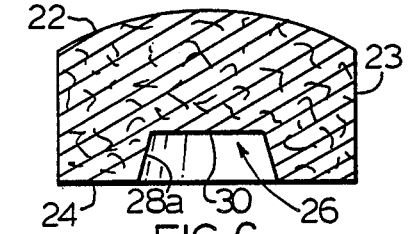

The inner wall 18a of the mold of FIG. 5 is upwardly and inwardly inclined to facilitate extraction of the bun from the mold. Thus, the resultant bun shown in FIG. 6 has a recess 26 with a peripheral wall 28a which is outwardly inclined towards the bottom surface 24.

Figure 7:
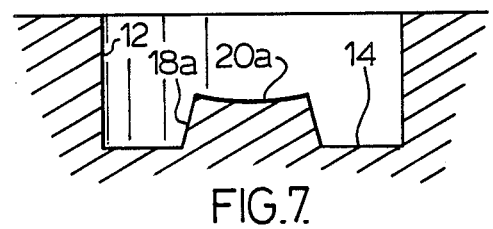
Figure 8:
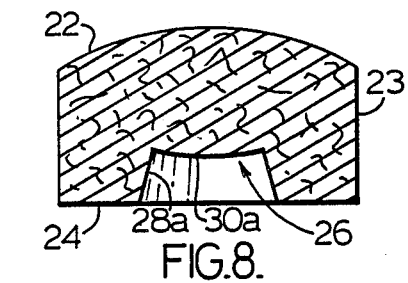

In the mold of FIG. 7, the top surface 20a is inwardly bowed and the inner peripheral wall 18a is upwardly and inwardly inclined. The resulting bun shown in FIG. 8 has a recess 26 with a bottom wall 30a which is bowed towards the bottom surface 24, and a peripheral wall 28a which is outwardly inclined.

In the mold shown in FIG. 9, the inner wall 18b is outwardly bowed and outwardly and inwardly inclined, and the top wall 20a is inwardly bowed. The recess 26 of the resultant bun shown in FIG. 10 has a bottom wall 30a which is outwardly bowed towards the bottom surface 24, and a peripheral side wall 28b which is outwardly inclined and also outwardly bowed.

It has been found that the molds shown in FIGS. 7 and 9, particularly FIG. 9, give the best results with respect to distribution of the dough in the mold and ease of extraction of the baked product. The best consistency for dough to be used in molds in accordance with the invention can readily be determined by a person skilled in the art with routine trial and experiment.

Using the bun of FIG. 10 as an example, the bun is cut across a horizontal plane indicated by the dotted line A above the recess 26 to provide an upper part 32 and a lower part 34. As shown in FIG. 11, the lower part 34 is turned upsidedown to position the recessed surface 24 upwards. Edible filling material 36 is then placed in the recess 26, and the upper part 32 is placed on top of the lower part 34 with the flat cut surface 38 of the upper part 32 resting on the flat upper surface 24 of the lower part 34 to close the recess 26. The flat cut surface 40 of the lower part 34 becomes the bottom surface of the bun.

Although the above description of preferred embodiments have been primarily concerned with buns which are circular in plan view, such as hamburger buns, it will be readily apparent that the invention is equally applicable to buns of other shapes, such as hot dog buns.

Other embodiments of the invention will also be readily apparent to a person skilled in the art, the scope of the invention being defined in the appended claims.

What I claim as new and desire to protect by Letters Patent of the United States is:

1. A method of making a filled bun or like product produced from dough, said method comprising placing dough in a mold having an outer peripheral wall defining the outer periphery of a bun to be baked, a flat bottom wall extending inwardly from the outer peripheral wall, and an upstanding recess-forming member surrounded by the bottom wall, said recess-forming member having an inner peripheral wall extending upwardly from said bottom wall, and a top extending across the top of the inner peripheral wall, said dough covering the recess-forming member, baking the dough in the mold to form a bun having a flat bottom surface with a recess, removing the baked bun from said mold, cutting the bun across a horizontal plane above the recess to provide an upper part and a lower part, turning the lower part upside down to position the recessed surface uppermost, placing edible filling material in the recess, and placing the upper part on the upside down lower part to form a filled bun.

2. A method according to claim 1 wherein the top wall of the mold is curved in a downwardly bowed manner.

3. A method according to claim 1 wherein the inner peripheral wall of the mold is upwardly and inwardly inclined.

4. A method according to claim 1 wherein the inner peripheral wall of the mold is upwardly and inwardly inclined and outwardly bowed.

5. A method according to claim 1 wherein the inner peripheral wall of the mold is upwardly and inwardly inclined and outwardly bowed, and the top wall of the mold is curved in a downwardly bowed manner.

6. A method according to claim 1 wherein the recess-forming member of the mold has a height which is approximately half the height of the outer peripheral mold wall.

* * * * *